US012640414B2

(12) United States Patent
Yoon et al.

(10) Patent No.: US 12,640,414 B2
(45) Date of Patent: May 26, 2026

(54) HEAT DISSIPATION MEMBER AND BATTERY PACK INCLUDING THE SAME

(71) Applicant: LG ENERGY SOLUTION, LTD., Seoul (KR)

(72) Inventors: Doohan Yoon, Daejeon (KR); Changkeun Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 562 days.

(21) Appl. No.: 18/025,601

(22) PCT Filed: Apr. 20, 2022

(86) PCT No.: PCT/KR2022/005649
§ 371 (c)(1),
(2) Date: Mar. 9, 2023

(87) PCT Pub. No.: WO2022/231201
PCT Pub. Date: Nov. 3, 2022

(65) Prior Publication Data
US 2023/0369672 A1 Nov. 16, 2023

(30) Foreign Application Priority Data

Apr. 30, 2021 (KR) ........................ 10-2021-0056421
Apr. 18, 2022 (KR) ........................ 10-2022-0047511

(51) Int. Cl.
*H01M 10/613* (2014.01)
*H01M 10/6555* (2014.01)
(Continued)

(52) U.S. Cl.
CPC ..... *H01M 10/613* (2015.04); *H01M 10/6555* (2015.04); *H01M 10/658* (2015.04); *H01M 50/291* (2021.01)

(58) Field of Classification Search
CPC ........... H01M 10/613; H01M 10/6555; H01M 10/658; H01M 50/291
See application file for complete search history.

(56) References Cited

U.S. PATENT DOCUMENTS

2013/0209847 A1     8/2013   Lev et al.
2013/0244066 A1     9/2013   Kang et al.
(Continued)

FOREIGN PATENT DOCUMENTS

JP     2004-362879 A     12/2004
JP     2005-116459 A     4/2005
(Continued)

OTHER PUBLICATIONS

International Search Report for PCT/KR2022/005649 (PCT/ISA/210) mailed on Aug. 2, 2022.
(Continued)

*Primary Examiner* — Jimmy Vo
(74) *Attorney, Agent, or Firm* — Birch, Stewart, Kolasch & Birch, LLP

(57) ABSTRACT

A heat dissipation member includes a frame member including a first frame and a second frame that are connected to each other. An inner surface of the first frame and an inner surface of the second frame are folded to face each other; a first heat insulating member attached to the outer surface of the first frame; a second heat insulating member attached to the outer surface of the second frame; a central heat insulating member located between the inner surface of the first frame and the inner surface of the second frame; a first heat dispersion member located between the inner surface of the first frame and the central heat insulating member; and a second heat dispersion member located between the inner surface of the second frame and the central heat insulating member.

13 Claims, 14 Drawing Sheets

(51) Int. Cl.
　　*H01M 10/658*　　　(2014.01)
　　*H01M 50/291*　　　(2021.01)

(56)　　　　　　References Cited

U.S. PATENT DOCUMENTS

| | | | |
|---|---|---|---|
| 2014/0234691 A1 | 8/2014 | Lee et al. | |
| 2019/0006642 A1 | 1/2019 | Sakaguchi et al. | |
| 2019/0181405 A1* | 6/2019 | Kim ................. | H01M 10/6556 |
| 2020/0058912 A1* | 2/2020 | Kuramitsu ......... | H01M 50/209 |
| 2020/0243812 A1 | 7/2020 | Keum | |
| 2021/0028517 A1 | 1/2021 | Choi et al. | |
| 2021/0351468 A1 | 11/2021 | Hur et al. | |

FOREIGN PATENT DOCUMENTS

| | | | |
|---|---|---|---|
| JP | 2008-185234 A | 8/2008 | |
| KR | 10-2013-0066651 A | 6/2013 | |
| KR | 10-2013-0086678 A | 8/2013 | |
| KR | 10-2019-0040837 A | 4/2019 | |
| KR | 10-2019-0044872 A | 5/2019 | |
| KR | 10-2019-0069873 A | 6/2019 | |
| KR | 10-2021-0000260 A | 1/2021 | |
| KR | 10-2021-0011642 A | 2/2021 | |
| WO | WO 2020/031736 A1 | 2/2020 | |

OTHER PUBLICATIONS

Extended European Search Report for corresponding European Application No. 22796034.1, dated Feb. 26, 2024.

* cited by examiner

[FIG. 1]
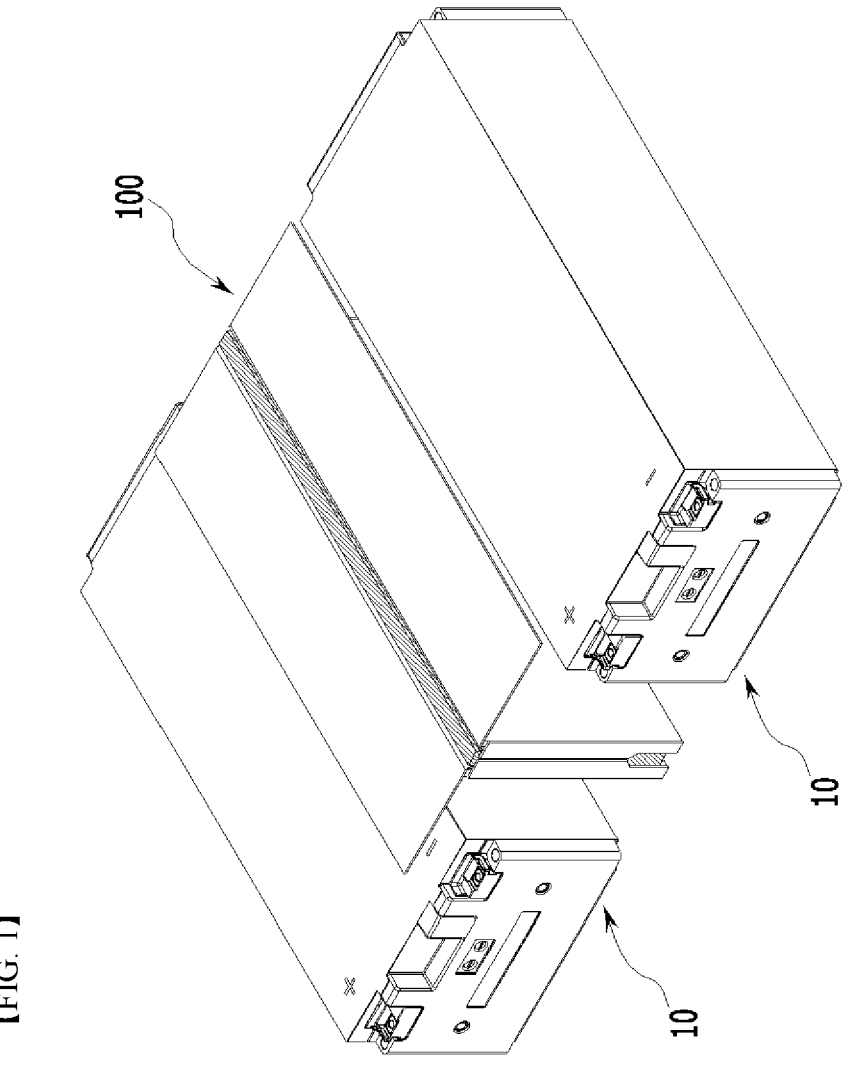

【FIG. 2】
100
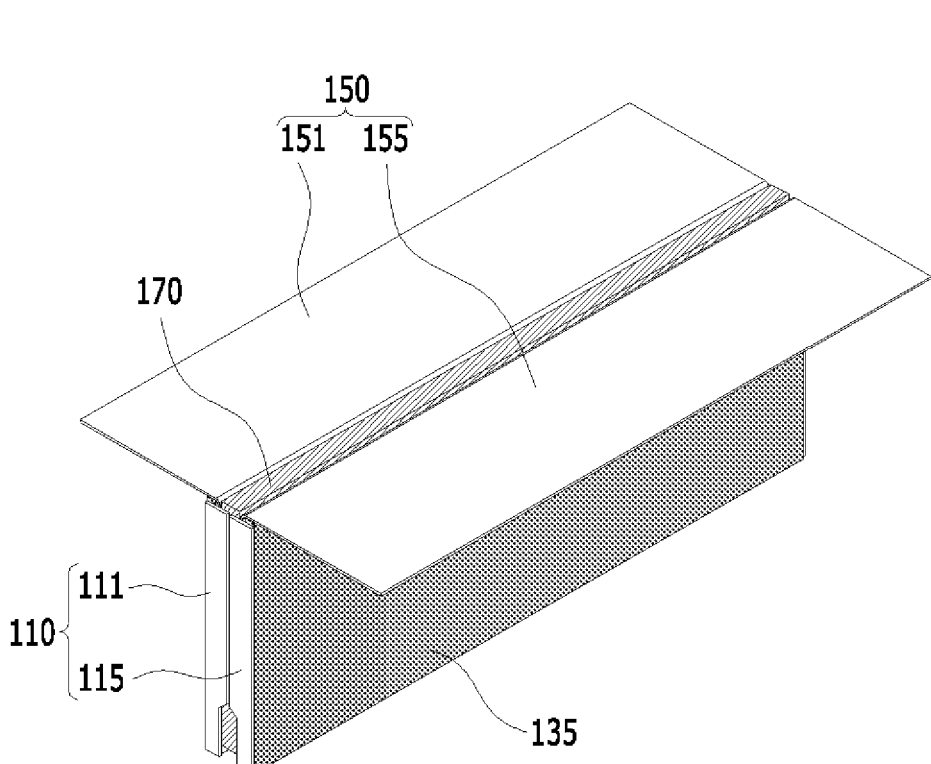

【FIG. 3】
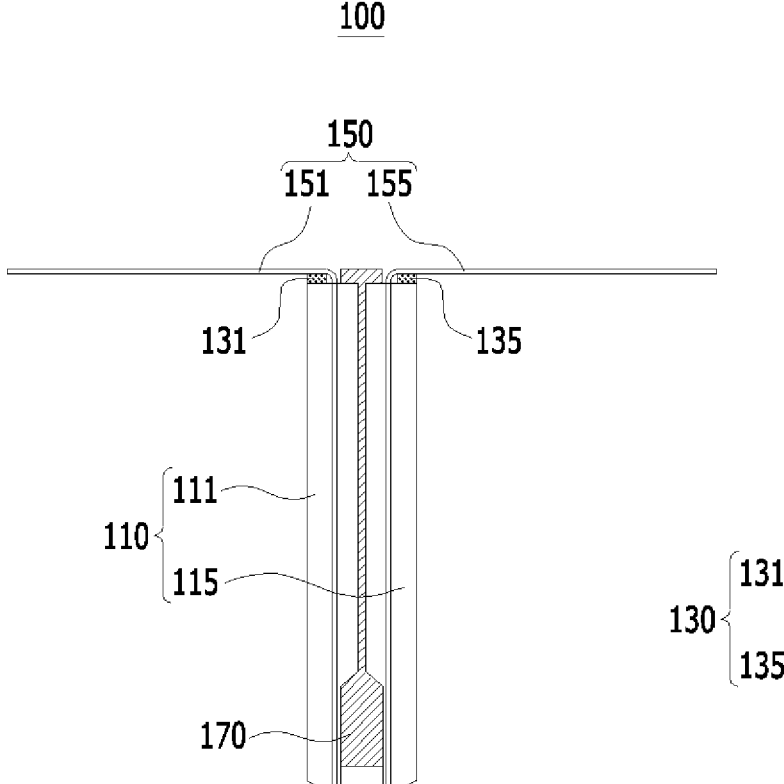

【FIG. 4】
110
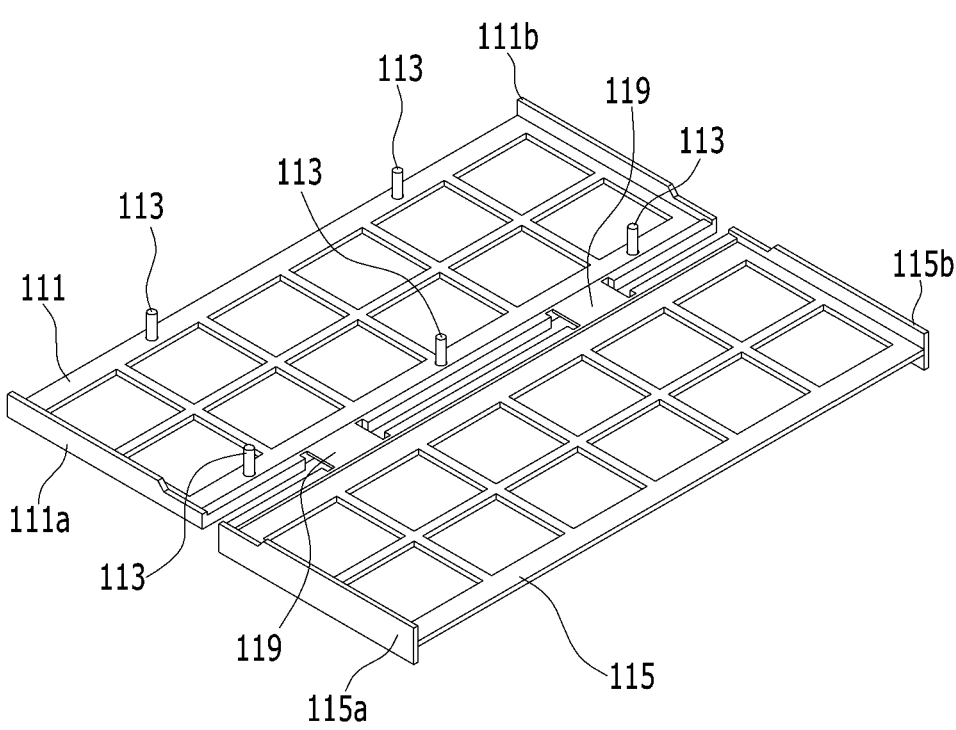

[FIG. 5]
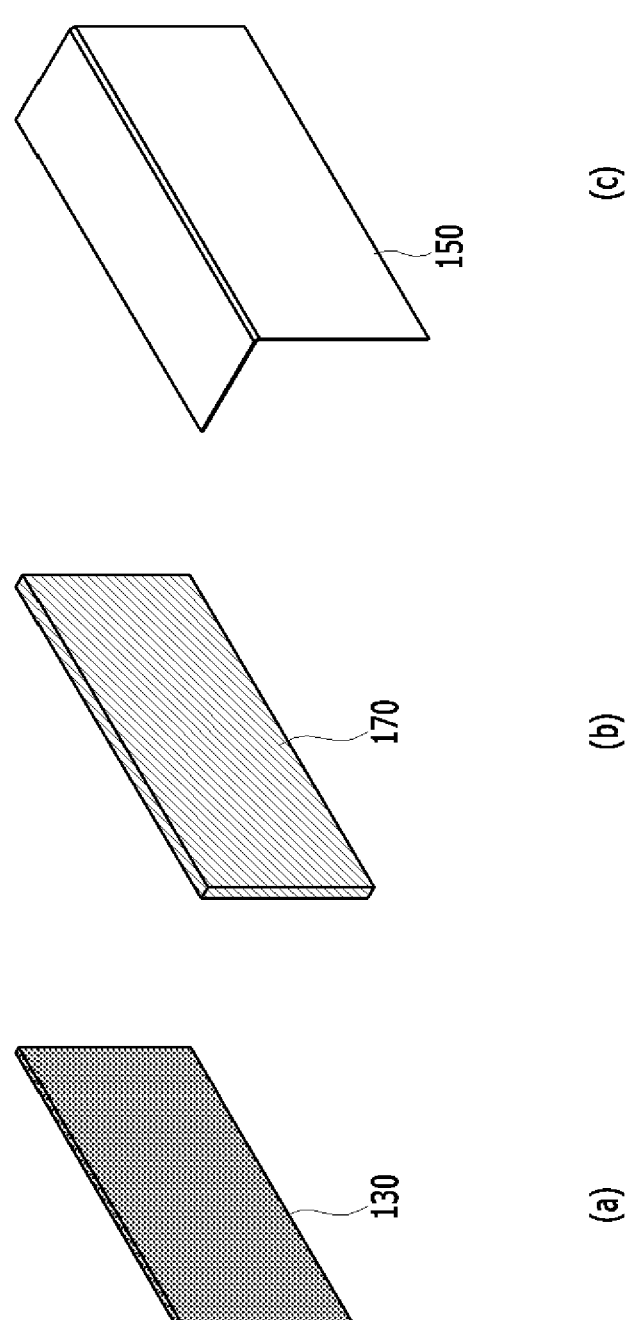
130
(a)
170
(b)
150
(c)

【FIG. 6】
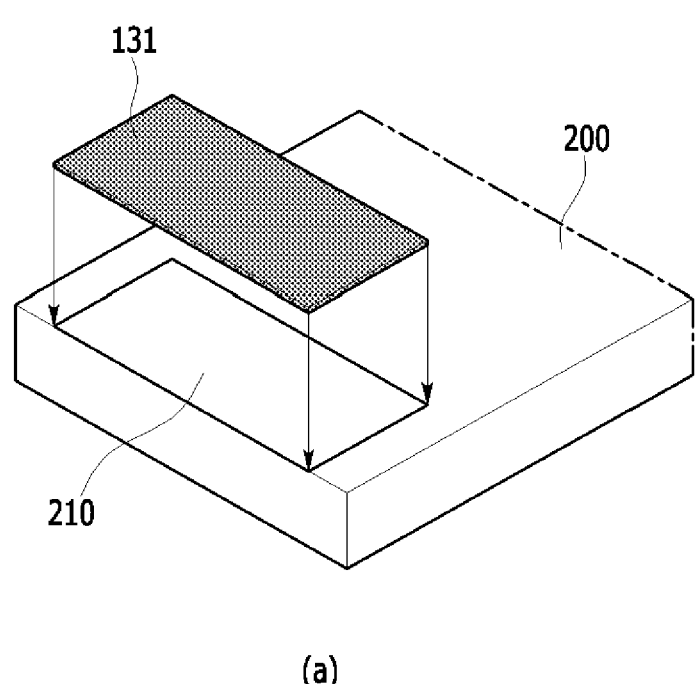
(a)
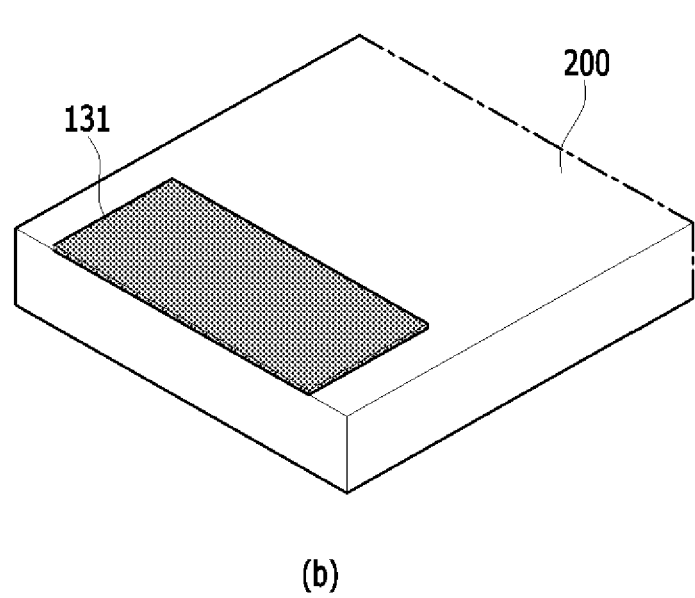
(b)

【FIG. 7】
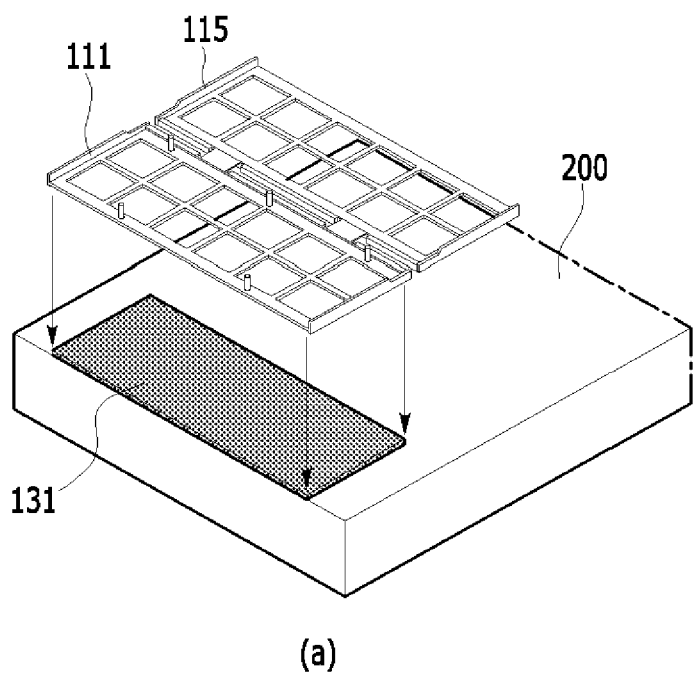
(a)
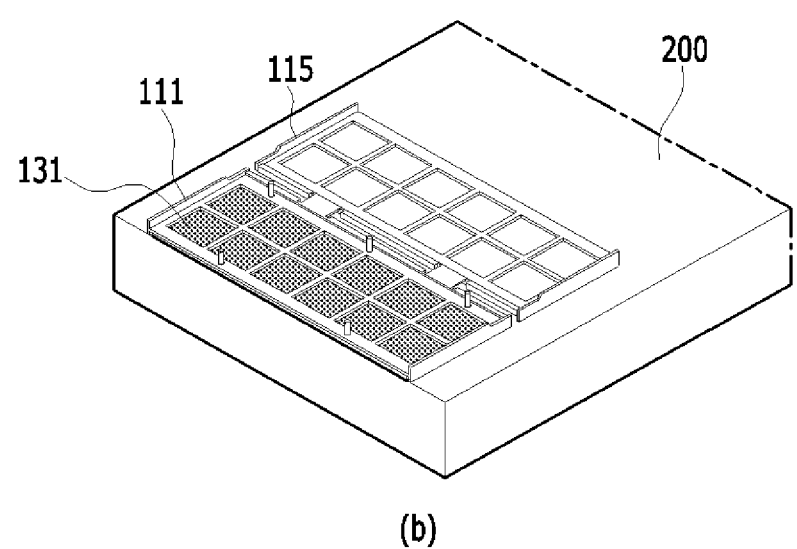
(b)

【FIG. 8】
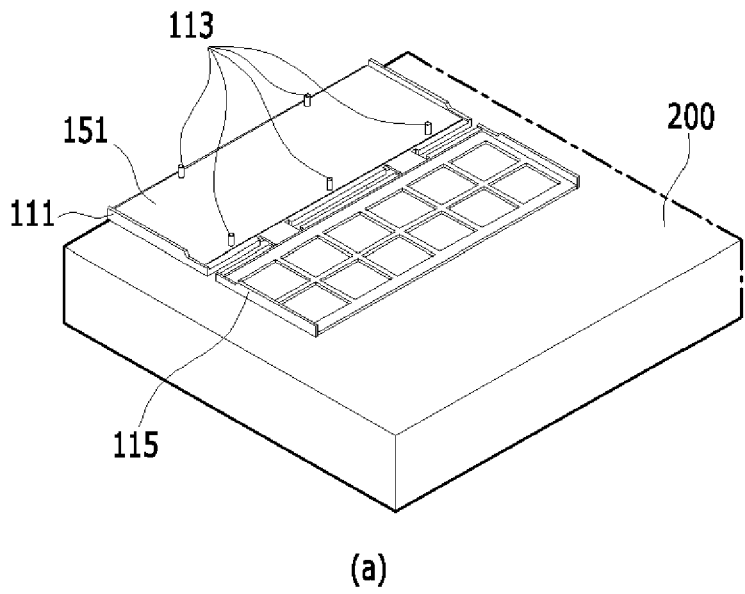
(a)
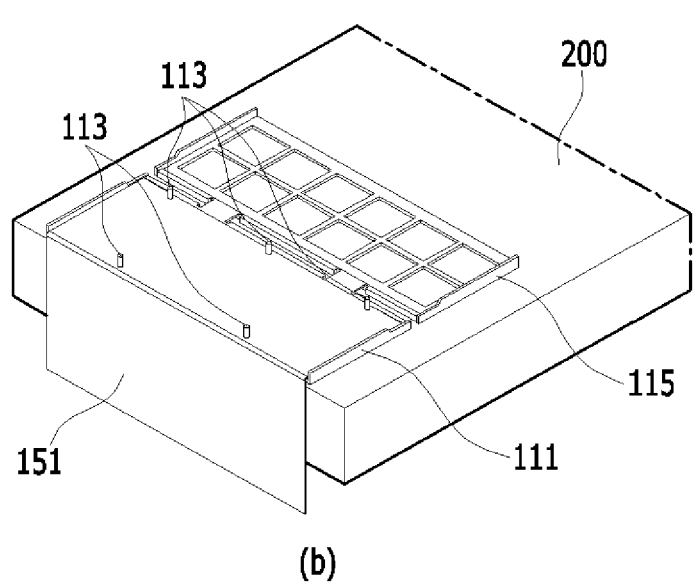
(b)

【FIG. 9】
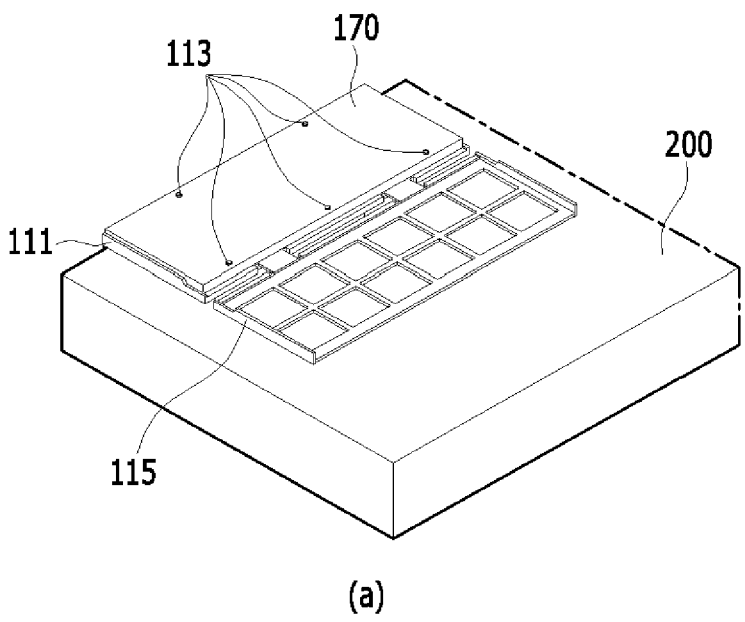
(a)
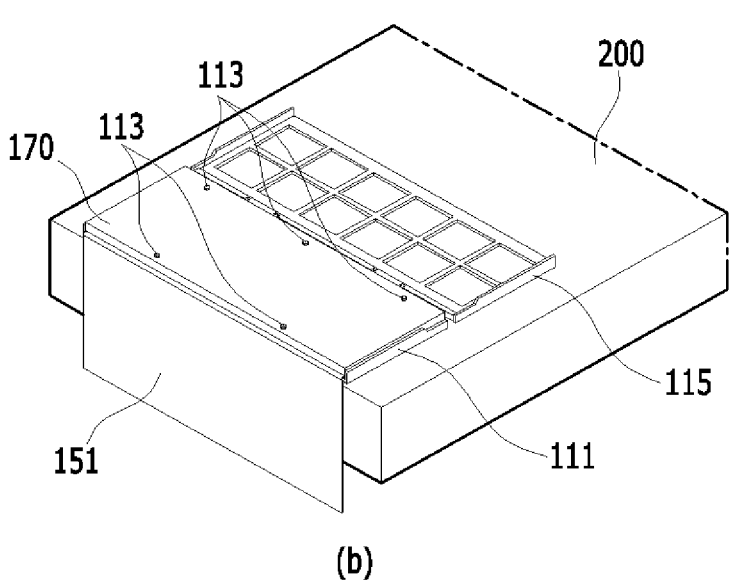
(b)

【FIG. 10】
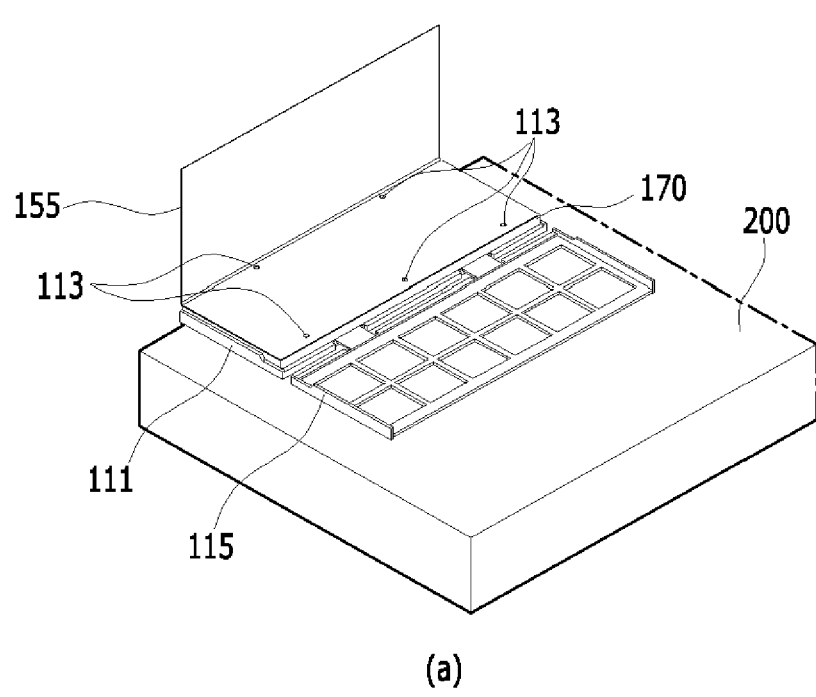
(a)
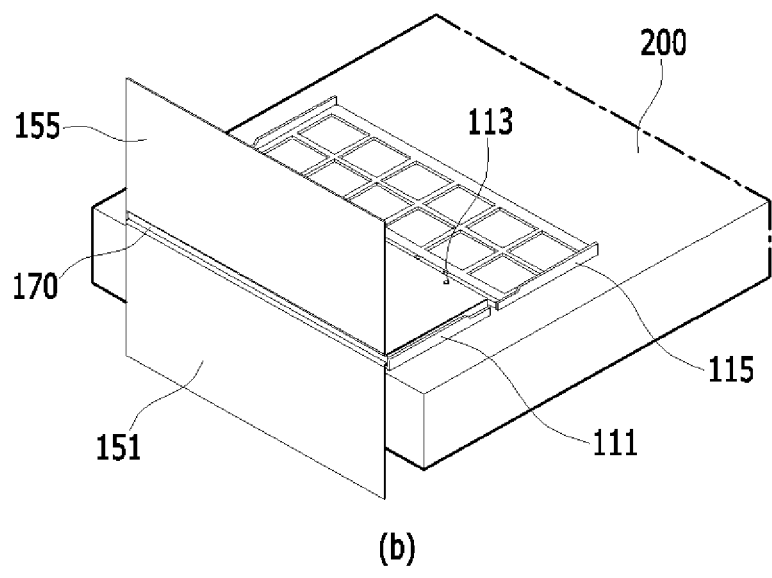
(b)

【FIG. 11】
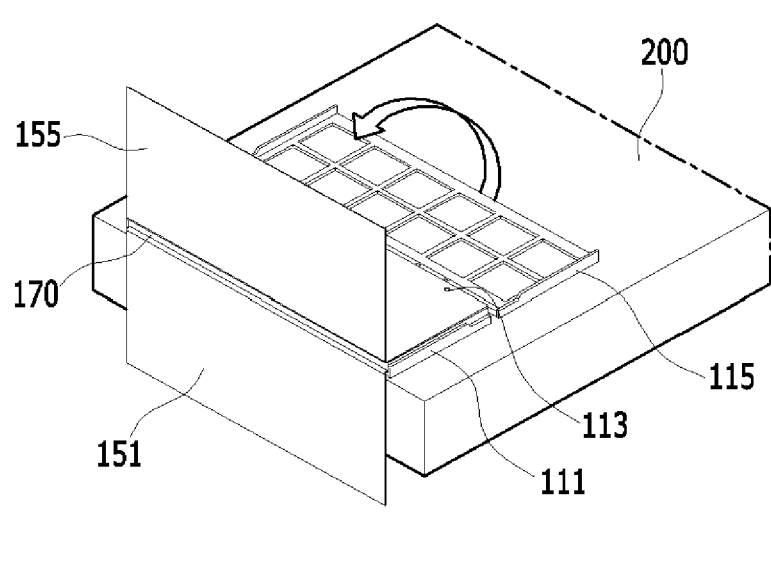
(a)
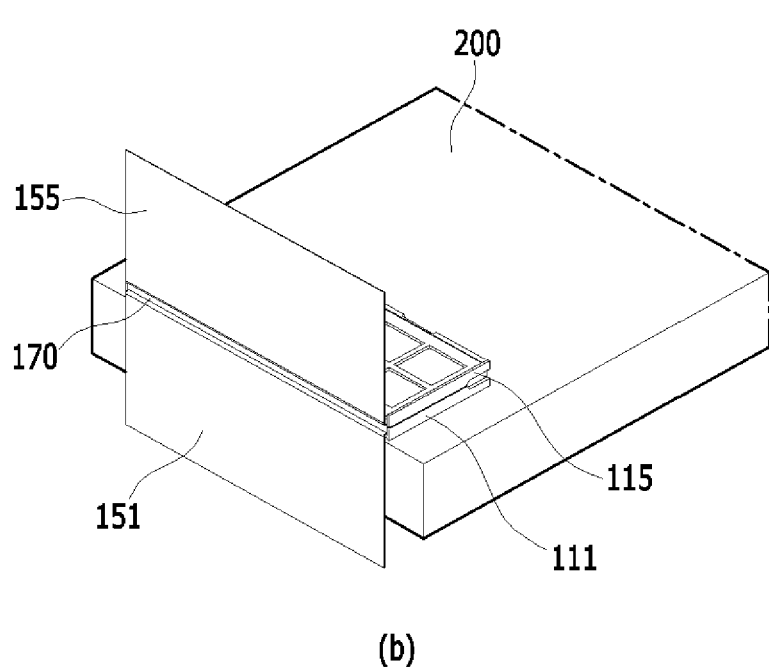
(b)

【FIG. 12】
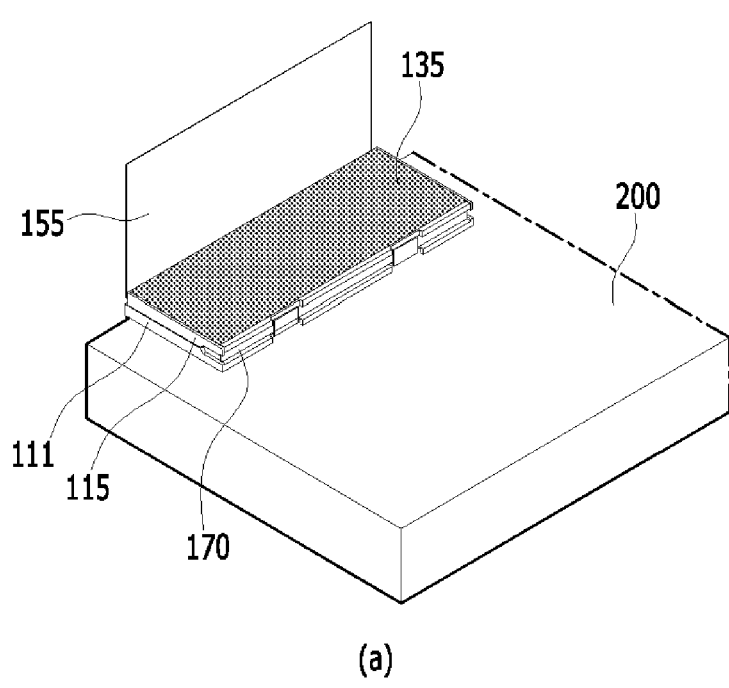
(a)
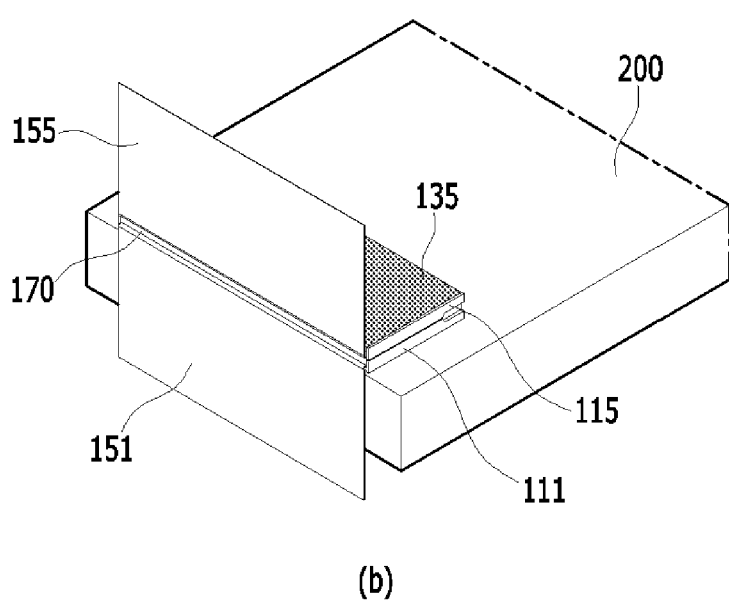
(b)

【FIG. 13】
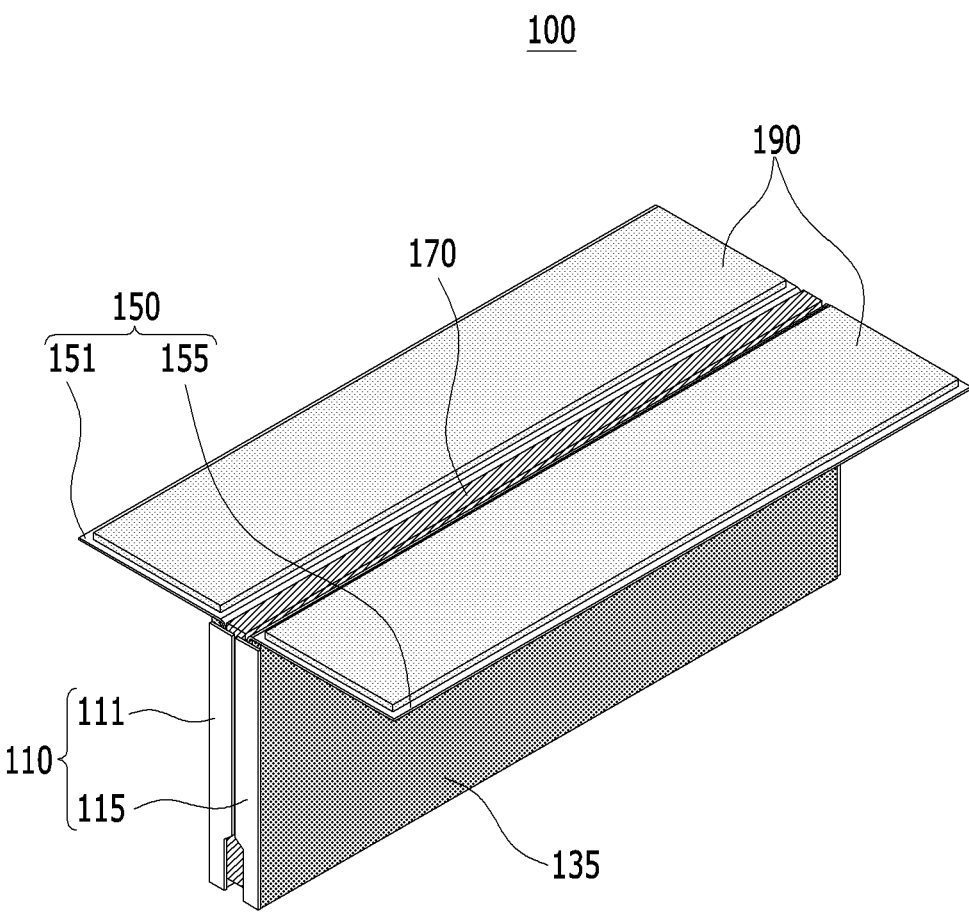

【FIG. 14】
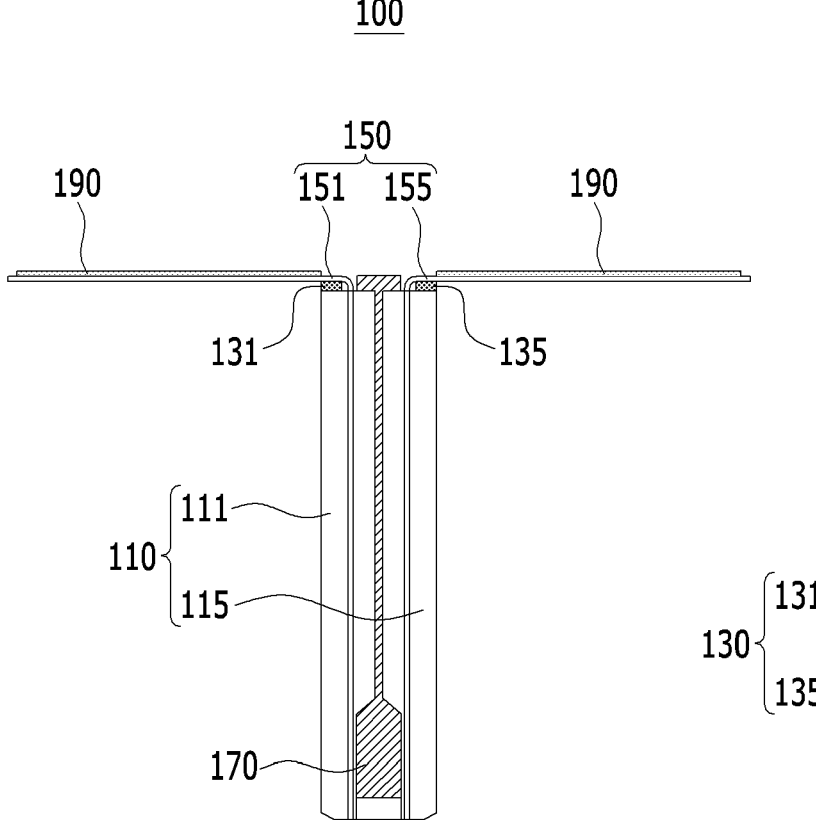

HEAT DISSIPATION MEMBER AND BATTERY PACK INCLUDING THE SAME

CROSS CITATION WITH RELATED APPLICATION(S)

This application claims the benefit of Korean Patent Application No. 10-2021-0056421 filed on Apr. 30, 2021 and Korean Patent Application No. 10-2022-0047511 filed on Apr. 18, 2022 in the Korean Intellectual Property Office, the contents of which are incorporated herein by reference in their entirety.

TECHNICAL FIELD

The present disclosure relates to a heat dissipation member that effectively disperses heat while preventing heat propagation between adjacent battery modules, and a battery pack including the same.

BACKGROUND

Along with the technology development and increased demand for mobile devices, demand for secondary batteries as energy sources has been increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is mainly used as a battery cell of the middle or large-sized battery module.

However, the battery pack of the conventional technique includes a plurality of battery modules, and if a thermal runaway occurs in a part of the battery cells of each battery module to cause ignition or explosion, heat or flame may be transferred to the adjacent secondary battery to cause a secondary explosion or the like. Therefore, more efforts are being made to prevent secondary ignition or explosion.

Therefore, there is a need to develop a heat dissipation member and a battery pack including the same that can effectively disperse generated heat while preventing heat transfer to adjacent battery modules at the time of ignition or explosion in a part of the battery modules in the battery pack.

DETAILED DESCRIPTION OF THE INVENTION

Technical Problem

It is an object of the present disclosure to provide a heat dissipation member that effectively disperses heat while preventing heat propagation between adjacent battery modules, and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a heat dissipation member comprising: a frame member including a first frame and a second frame that are connected to each other, wherein the first frame and second frame are folded so that an inner surface of the first frame and an inner surface of the second frame face each other; a first heat insulating member attached to an outer surface of the first frame; a second heat insulating member attached to an outer surface of the second frame; a central heat insulating member located between the inner surface of the first frame and the inner surface of the second frame; a first heat dispersion member located between the inner surface of the first frame and the central heat insulating member; and a second heat dispersion member located between the inner surface of the second frame and the central heat insulating member.

The first heat dispersion member further includes a surface that is bent in a direction perpendicular to the first frame, the second heat dispersion member further includes a surface that is bent in a direction perpendicular to the second frame, and the first heat dispersion member and the second heat dispersion member may be bent in opposite directions to each other.

The first frame and the second frame may each include at least one cross-shaped structure.

At least one hinge is formed between the first frame and the second frame.

First side surface parts may be respectively formed on both sides of the first frame, and second side surface parts may be respectively formed on both sides of the second frame.

The first side surface part may cover a side surface of the first heat insulating member, a side surface of the first heat dispersion member, and a side surface of the central heat insulating member, and the second side surface part may cover a side surface of the second heat insulating member, a side surface of the second heat dispersion member, and the side surface of the central heat insulating member.

At least one protrusion may be formed on an inner surface of at least one of the first frame and the second frame.

The at least one protrusion may pass through the first heat dispersion member, the second heat dispersion member, and the central heat insulating member.

A width of the central heat insulating member may be greater than a width of the first heat insulating member or a width of the second heat insulating member.

The heat dissipation member according to another embodiment of the present disclosure may further include a cooling pad formed on the first heat dispersion member and the second heat dispersion member.

According to yet another embodiment of the present disclosure, there is provided a battery pack comprising the above-mentioned heat dissipation member, wherein the heat dissipation member is located between a pair of adjacent battery modules among a plurality of battery modules.

A side surface of a first battery module among the pair of adjacent battery modules makes contact with the first heat insulating member, and a side surface of a second battery module among the pair of adjacent battery modules makes contact with the second heat insulating member.

An upper part of the first battery module may make contact with at least a part of the first heat dispersion member, and an upper part of the second battery module may make contact with at least a part of the second heat dispersion member.

Advantageous Effects

In a heat dissipation member and a battery pack including the same according to an embodiment of the present disclosure, the heat dispersion member included in the heat dissipation member is located between the heat insulating members, thereby capable of effectively dispersing heat while preventing heat propagation between adjacent battery modules.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a diagram which shows briefly a pair of battery modules and a heat dissipation member included in a battery pack according to an embodiment of the present disclosure;

FIG. 2 is a perspective view which shows the heat dissipation member of FIG. 1;

FIG. 3 is a front view of the heat dissipation member of FIG. 1;

FIG. 4 is a diagram which shows a frame member included in the heat dissipation member of FIG. 1;

FIG. 5 is a diagram which shows a heat insulating member and a heat dispersion member included in the heat dissipation member of FIG. 1;

FIGS. 6 to 12 are diagrams which show a process of assembling the heat dissipation member of FIG. 1; and FIGS. 13 and 14 are diagrams which show a heat dissipation member according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure can be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Hereinafter, a battery pack including the heat dissipation member according to an embodiment of the present disclosure will be described.

FIG. 1 is a diagram which shows briefly a pair of battery modules and a heat dissipation member included in a battery pack according to an embodiment of the present disclosure.

Referring to FIG. 1, a battery pack according to an embodiment of the present disclosure includes the heat dissipation member 100, wherein the heat dissipation member 100 is located between a pair of adjacent battery modules 10 among the plurality of battery modules.

Here, the battery module 10 is not specifically shown in the figure, but a plurality of battery cells (not shown) can be stacked along a predetermined direction and then mounted on the module frame to configure a battery module. Here, since the plurality of battery cells (not shown) are not particularly limited by the type thereof, a pouch type secondary battery or a prismatic secondary battery may be used.

Further, in the present embodiment, one side surface of one battery module 10 among the pair of battery modules 10 may make contact with the first heat insulating member 131 (FIG. 3), and one side surface of the other one battery module 10 among the pair of battery modules 10 may make contact with the second heat insulating member 135 (FIG. 3).

Thereby, according to the present embodiment, when ignition or explosion occurs in a part of the battery modules, heat transfer between adjacent battery modules 10 can be blocked by the heat insulating member 130 (FIG. 3) of the heat dissipation member 100, thereby preventing continuous ignition or explosion due to heat propagation between adjacent battery modules 10.

Further, the upper part of one battery module 10 among the pair of battery modules 10 makes contact with at least a part of the first heat dispersion member 151 (FIG. 2), and an upper part of the other one battery module 10 among the pair of battery modules 10 may make contact with at least a part of the second heat dispersion member 155 (FIG. 2).

Thereby, according to the present embodiment, when ignition or explosion occurs in a part of the battery modules, the heat generated in the adjacent battery module 10 moves along the heat dispersion member 150 (FIG. 2) of the heat dissipation member 100, and thus, heat generated in the battery module 10 can be effectively and quickly dispersed.

Next, a heat dissipation member according to an embodiment of the present disclosure will be described in more detail.

FIG. 2 is a perspective view which shows the heat dissipation member of FIG. 1. FIG. 3 is a front view of the heat dissipation member of FIG. 1. FIG. 4 is a diagram which shows a frame member included in the heat dissipation member of FIG. 1. FIG. 5 is a diagram which shows a heat insulating member and a heat dispersion member included in the heat dissipation member of FIG. 1.

Referring to FIGS. 2 and 3, the heat dissipation member 100 according to an embodiment of the present disclosure includes a frame member 110 including a first frame 111 and a second frame 115 that are connected to each other, wherein an inner surface of the first frame 111 and an inner surface of the second frame 115 are folded to face each other; a first heat insulating member 131 attached to the outer surface of the first frame 111; a second heat insulating member 135 attached to the outer surface of the second frame 115; a central heat insulating member 170 located between the inner surface of the first frame 111 and the inner surface of the second frame 115; a first heat dispersion member 151 located between the inner surface of the first frame 111 and the central heat insulating member 170; and a second heat dispersion member 155 located between the inner surface of the second frame 115 and the central heat insulating member 170.

More specifically, referring to FIGS. 2 and 4, the frame member 110 may include a first frame 111 and a second frame 115 that are connected to each other. More specifically, the frame member 110 can be folded so that the inner surface of the first frame 111 and the inner surface of the second frame 115 face each other.

As an example, the frame member 110 may have at least one hinge coupling part 119 formed between the first frame 111 and the second frame 115. Here, the hinge coupling part 119 may have a hinge coupling structure commonly used in the art.

Thereby, the first frame 111 and the second frame 115 are folded in a direction in which the inner surface of the first frame 111 and the inner surface of the second frame 115 face each other on the basis of the hinge coupling part 119. In addition, the hinge coupling part 119 is located below the frame member 110 to prevent up/down separation of the heat dispersion member 150 and the central heat insulating member 170.

Referring to FIG. 4, each of the first frame 111 and the second frame 115 may be a lattice frame including at least one cross-shaped structure. However, the shapes of the first frame 111 and the second frame 115 are not limited thereto, and any shape capable of maintaining the rigidity of the frame member 110 can be included in the present embodiment.

Further, in the frame member 110, first side surface parts 111a and 111b may be respectively formed on both sides of the first frame 111, and second side parts 115a and 115b may be respectively formed on both sides of the second frame 115. More specifically, the first side surface parts 111a and 111b may be extended in the up/down direction on the basis of the wide surface of the first frame 111, and the second side surface parts 115a and 115b may be extended in the up/down direction on the basis of the wide surface of the second frame 115.

More specifically, referring to FIGS. 3 and 4, the first side surface parts 111a and 111b of the first frame 111 can cover the side surface of the first heat insulating member 131 attached to the outer surface of the first frame 111. In addition, the first side surface parts 111a and 111b of the first frame 111 can cover the side surfaces of the first heat dispersion member 151 and the central heat insulating member 170 located on the inner surface of the first frame 111.

Even in the case of the second side surface parts 115a and 115b of the second frame 115, they can similarly cover the side surface of the second heat insulating member 135 attached to the outer surface of the second frame 115. In addition, the second side surface parts 115a and 115b of the second frame 115 can cover the side surfaces of the second heat dispersion member 155 and the central heat insulating member 170 located on the inner surface of the second frame 115.

Thereby, the frame member 110 can cover the side surfaces of the heat insulating member 130, the heat dispersion member 150 and the central heat insulating member 170 located on the inner surface or outer surface of the first frame 111 and the second frame 115, thereby preventing left and right separation of the heat insulating member 130, the heat dispersion member 150 and the central heat insulating member 170 and protecting them from external impact.

Referring to FIG. 4, the frame member 110 may have at least one protrusion 113 formed on the inner surface of at least one of the first frame 111 and the second frame 115. As an example, as shown in FIG. 4, the protrusion 113 may be formed only on the inner surface of the first frame 111. However, the present disclosure is not limited thereto, and the protrusion 113 may be formed on the inner surface of the second frame 115, or may be formed on the inner surface of the first frame 111 and the second frame 115, respectively.

Here, the protrusion 113 may pass through the first heat dispersion member 151, the second heat dispersion member 155, and the central heat insulating member 170. More specifically, the first heat dispersion member 151, the second heat dispersion member 155, and the central heat insulating member 170 may be previously formed with holes into which the protrusions 113 can be fitted.

Thereby, the frame member 110 can more stably fix the heat dispersion member 150 and the central heat insulating member 170 located on the inner surfaces of the first frame 111 and the second frame 115 within the frame member 110.

Further, the frame member 110 may be made of a material such as polycarbonate-acrylonitrile butadiene styrene (PC-ABS), polybutylene terephthalate (PBT), or polypropylene (PP). However, the material of the frame member 110 is not limited thereto, and any material having low thermal conductivity while maintaining the rigidity of the frame member 110 can be included in the present embodiment.

Referring to FIGS. 2, 3 and 5(a), the heat insulating member 130 may include a first heat insulating member 131 and a second heat insulating member 135, wherein the first heat insulating member 131 may be attached to the outer surface of the first frame 111, and the second heat insulating member 135 may be attached to the outer surface of the second frame 115.

Here, the first heat insulating member 131 may be extended along the outer surface of the first frame 111, but may be extended to the first side surface parts 111a and 111b. Further, the second heat insulating member 135 is extended along the outer surface of the second frame 115, but can be extended to the second side surface parts 115a and 115b.

Further, the heat insulating member 130 may be made of silicon oxide. As an example, the silicon oxide may be made of a material such as glass fiber. However, the material of the heat insulating member 130 is not limited thereto, and any material having high heat insulating properties can be included in the present embodiment.

Thereby, according to the present embodiment, the heat insulating member 130 can block the heat transfer between adjacent battery modules 10 (FIG. 1).

Referring to FIGS. 2, 3, and 5(b), the central heat insulating member 170 may be located between the inner surface of the first frame 111 and the inner surface of the second frame 115. More specifically, the central heat insulating member 170 may be located between the first heat dispersion member 151 and the second heat dispersion member 155.

Here, the central heat insulating member 170 may have a width larger than the width of the heat insulating member 130. More specifically, the central heat insulating member 170 may have a width larger than a width of the first heat insulating member 131 or a width of the second heat insulating member 135.

As an example, the width of the central heat insulating member 170 may be twice the width of the first heat insulating member 131 or the width of the second heat insulating member 135. However, the width of the central insulating member 170 is not limited thereto, and any width sufficient to block the heat transfer between the first heat dispersion member 151 and the second heat dispersion member 155 can be included in the present embodiment.

Further, the central heat insulating member 170 may be made of silicon oxide. As an example, the silicon oxide may be made of a material such as glass fiber. However, the material of the central heat insulating member 170 is not limited thereto, and any material having high heat insulating properties can be included in the present embodiment.

Thereby, according to the present embodiment, even if heat is transferred from the battery module 10 (FIG. 1) to the first heat dispersion member 151 and the second heat dispersion member 155, respectively, the central heat insulating member 170 can block the heat transfer between the first heat dispersion member 151 and the second heat dispersion member 155.

Referring to FIGS. 2, 3 and 5(c), the heat dispersion member 150 may include a first heat dispersion member 151 and a second heat dispersion member 155. More specifically, the first heat dispersion member 151 may be located between the inner surface of the first frame 111 and the central heat insulating member 170, and the second heat dispersion member 155 may be located between the inner surface of the second frame 115 and the central heat insulating member 170.

Here, the heat dispersion member 150 may further include a surface bent in a direction perpendicular to the frame member 110. More specifically, the first heat dispersion member 151 may further include a surface bent in a direction perpendicular to the first frame 111, and the second heat dispersion member 155 may further include a surface bent in a direction perpendicular to the second frame 115. Here, the first heat dispersion member 151 and the second heat dispersion member 155 may be bent in opposite directions to each other.

Further, the heat dispersion member 150 may be made of a material such as aluminum (Al) or graphite. However, the material of the heat dispersion member 150 is not limited thereto, and any material having high thermal conductivity can be included in the present embodiment.

Thereby, according to the present embodiment, the upper part of the battery module 10 (FIG. 1) is located adjacent to the bent surface of the first heat dispersion member 151 or the bent surface of the second heat dispersion member 155, respectively, so that heat generated in the battery module 10 (FIG. 1) can be easily dispersed to the first heat dispersion member 151 or the second heat dispersion member 155. In addition, the bent surface of the first heat dispersion member 151 or the bent surface of the second heat dispersion member 155 makes contact with the cooling member formed on the upper part of the pack frame (not shown), so that heat generated in the battery module 10 (FIG. 1) can be effectively dissipated.

Next, the process of assembling respective components of the heat dissipation member 100 according to the present embodiment will be described in detail.

FIGS. 6 to 12 are diagrams which show a process of assembling the heat dissipation member of FIG. 1.

Referring to FIG. 6, the first heat insulating member 131 may be located in a groove 210 formed in the jig 220 prepared in advance as shown in FIG. 6(a), and the first heat insulating member 131 can be stably fixed to the groove 210 as shown in FIG. 6(b).

Next, referring to FIG. 7, the position is adjusted so that the outer surfaces of the first heat insulating member 131 and the first frame 111 face each other as shown in FIG. 7(a), and then, the outer surface of the first frame 111 can be seated on the first heat insulating member 131 as shown in FIG. 7(b).

Next, referring to FIG. 8, one surface of the first heat dispersion member 151 is seated on the inner surface of the first frame 111, wherein the protrusion 113 formed in the first frame 111 can pass through the first heat dispersion member 151. Here, the first heat dispersion member 151 may have a hole having a size corresponding to that of the protrusion 113 formed in advance.

Next, referring to FIG. 9, the central heat insulating member 170 is seated on the first heat dispersion member 151, wherein the protrusion 113 formed in the first frame 111 can pass through the central heat insulating member 170. Here, even in the case of the central heat insulating member 170, a hole having a size corresponding to that of the protrusion 113 may be formed in advance.

Next, referring to FIG. 10, the second heat dispersion member 155 is seated on the central heat insulating member 170, wherein the protrusion 113 formed on the first frame 111 can pass through the second heat dispersion member 155. Here, even in the case of the second heat dispersion member 155, a hole having a size corresponding to that of the protrusion 113 can be formed in advance.

Next, referring to FIG. 11, the second frame 115 is folded in a direction in which the inner surface of the second frame 115 and the inner surface of the first frame 111 face each other, wherein an inner surface of the second frame 115 can be seated on the second heat dispersion member 155.

Next, referring to FIG. 12, the second heat insulating member 135 can be seated on the outer surface of the second frame 115.

Thereby, according to the present embodiment, the heat dissipation member 100 may have respective components assembled by the above-mentioned process, whereby the assembly process is relatively simple and can be fixed by mechanical coupling between parts without separate adhesive layers, thus further improving the productivity.

Further, although not shown in FIGS. 6 to 12, according to another embodiment of the present disclosure, a hook structure or a snap fit structure is formed on at least a part of components, whereby components included in the heat dissipation member 100 can be fixed to each other by a hook coupling or a snap-fit coupling.

Thereby, according to the present embodiment, the coupling force between components is further improved, and thus, the quality of the heat dispersion member 100 can also be further improved.

Next, the heat dissipation member 100 according to another embodiment of the present disclosure will be described. At this time, the heat dissipation member according to the present embodiment includes all the configurations of the heat dissipation member according to the present embodiments, the corresponding description will be omitted to avoid repetition and redundancy.

FIGS. 13 and 14 are diagrams which show a heat dissipation member according to another embodiment of the present disclosure.

Referring to FIGS. 13 and 14, the heat dissipation member 100 according to the present embodiment may further include a cooling pad 190 formed on the heat dispersion member 150. That is, the heat dissipation member 100 according to the present embodiment may further include a cooling pad 190 formed on the first heat dispersion member 151 and the second heat dispersion member 155. More specifically, the cooling pad 190 included in the heat dissipation member 100 according to the present embodiment may be formed of a compressible cooling pad.

The cooling pad 190 may be formed on bent surfaces of the first heat dispersion member 151 and the second heat dispersion member 155. At this time, the cooling pad 190 may be formed so as to have the same area as the bent surface, or may be formed so as to have an area smaller than the bent surface. Therefore, the heat transferred through the first heat dispersion member 151 and the second heat dispersion member 152 can be rapidly cooled and transferred through the cooling pad 190.

In this case, the cooling pad 190 may be formed of a silicon-based or acrylic-based material. Specifically, the cooling pad 190 may be a silicone pad, a silicone rubber pad, a silicone polymer pad, or the like, and may be an acrylic pad, an acrylic polymer pad, or the like, but is not limited thereto.

The cooling pad 190 is formed on the heat dispersion member 150 of the heat dissipation member 100 according to the present embodiment, thereby capable of further making contact with a pack frame (not shown) of the battery pack including the heat dissipation member 100. Therefore, the heat generated in the battery module 100 is transferred to the pack frame of the battery pack through the heat dissipation member 150 and the cooling pad 190, so that heat generated in the battery module 10 can be effectively and quickly dispersed. In particular, the cooling pad 190 is formed of a compressible cooling pad, and makes close contact with the pack frame of the battery pack, thereby minimizing thermal contact resistance and enabling formation of an effective heat transfer path.

Meanwhile, the device according to the present embodiment may include the above-mentioned battery pack. Such a device can be applied to a vehicle means such as an electric bicycle, an electric vehicle, or a hybrid vehicle, but the present disclosure is not limited thereto, and is applicable to various devices that can use a battery module and a battery pack including the same, which is also falls within the scope of the present disclosure.

Although preferred embodiments of the present disclosure have been described in detail above, the scope of the present disclosure is not limited thereto, and various modifications and improvements made by those skilled in the art using the basic concepts of the present disclosure, which are defined in the appended claims, also falls within the scope of the present disclosure.

DESCRIPTION OF REFERENCE NUMERALS

10: battery module
100: heat dissipation member
110: frame member
130: heat insulating member
150: heat dispersion member
170: central insulation member
190: cooling pad

The invention claimed is:

1. A heat dissipation member comprising:
a frame member including a first frame and a second frame that are connected to each other, wherein the first frame and second frame are folded so that an inner surface of the first frame and an inner surface of the second frame face each other;

a first heat insulating member attached to an outer surface of the first frame;
a second heat insulating member attached to an outer surface of the second frame;
a central heat insulating member located between the inner surface of the first frame and the inner surface of the second frame;
a first heat dispersion member located between the inner surface of the first frame and the central heat insulating member; and
a second heat dispersion member located between the inner surface of the second frame and the central heat insulating member.

2. The heat dissipation member of claim 1, wherein:
the first heat dispersion member further comprises a surface that is bent in a direction perpendicular to the first frame,
the second heat dispersion member further comprises a surface that is bent in a direction perpendicular to the second frame, and
the first heat dispersion member and the second heat dispersion member are bent in opposite directions to each other.

3. The heat dissipation member of claim 1, wherein:
the first frame and the second frame each include at least one cross-shaped structure.

4. The heat dissipation member of claim 1, wherein:
at least one hinge is formed between the first frame and the second frame.

5. The heat dissipation member of claim 4, wherein:
first side surface parts are respectively formed on both sides of the first frame, and
second side surface parts are respectively formed on both sides of the second frame.

6. The heat dissipation member of claim 5, wherein:
the first side surface part covers a side surface of the first heat insulating member, a side surface of the first heat dispersion member, and a side surface of the central heat insulating member, and
the second side surface part covers a side surface of the second heat insulating member, a side surface of the second heat dispersion member, and the side surface of the central heat insulating member.

7. The heat dissipation member of claim 4, wherein:
at least one protrusion is formed on an inner surface of at least one of the first frame and the second frame.

8. The heat dissipation member of claim 7, wherein:
the at least one protrusion passes through the first heat dispersion member, the second heat dispersion member, and the central heat insulating member.

9. The heat dissipation member of claim 1, wherein:
a width of the central heat insulating member is greater than a width of the first heat insulating member or a width of the second heat insulating member.

10. The heat dissipation member of claim 1,
which further comprises a cooling pad formed on the first heat dispersion member and the second heat dispersion member.

11. A battery pack comprising the heat dissipation member of claim 1, wherein the heat dissipation member is located between a pair of adjacent battery modules among a plurality of battery modules.

12. The battery pack of claim 11, wherein:
a side surface of a first battery module among the pair of adjacent battery modules makes contact with the first heat insulating member, and a side surface of a second battery module among the pair of adjacent battery modules makes contact with the second heat insulating member.

13. The battery pack of claim 12, wherein:

an upper part of the first battery module makes contact with at least a part of the first heat dispersion member, and an upper part of the second battery module makes contact with at least a part of the second heat dispersion member.

* * * * *